United States Patent [19]

Yamada

[11] Patent Number: 4,540,299
[45] Date of Patent: Sep. 10, 1985

[54] MARGIN AND TAB STOP DETERMINING APPARATUS RESPONSIVE TO PAGE EDGE SENSOR

[75] Inventor: Yasuaki Yamada, Funabashi, Japan

[73] Assignee: Canon Kabushiki Kaisha, Tokyo, Japan

[21] Appl. No.: 539,468

[22] Filed: Oct. 6, 1983

Related U.S. Application Data

[63] Continuation of Ser. No. 447,519, Dec. 7, 1982, abandoned, which is a continuation of Ser. No. 173,887, Jul. 31, 1980, abandoned.

[30] Foreign Application Priority Data

Aug. 9, 1979 [JP] Japan .................................. 54-100760

[51] Int. Cl.³ .............................................. B41J 29/42
[52] U.S. Cl. .................... 400/708; 400/279; 400/342; 400/639.1
[58] Field of Search ...................... 400/126, 157.3, 174, 400/279, 320, 342, 568, 639.1, 697.1, 705.1, 706, 708, 708.1; 364/706, 751

[56] References Cited

U.S. PATENT DOCUMENTS

| | | | |
|---|---|---|---|
| 3,204,746 | 9/1965 | Wolowitz | 400/697.1 |
| 3,548,179 | 12/1970 | Kimura et al. | 364/751 |
| 3,839,630 | 10/1974 | Olander et al. | 364/706 |
| 4,031,996 | 6/1977 | Busch | 400/279 |
| 4,050,564 | 9/1977 | Carmichael et al. | 400/126 |
| 4,051,945 | 10/1977 | Fujimoto et al. | 400/279 |
| 4,067,430 | 1/1978 | Wienhold | 400/279 X |
| 4,074,798 | 2/1978 | Berger | 400/174 |
| 4,226,546 | 10/1980 | Hoffman | 400/157.3 X |
| 4,255,064 | 3/1981 | Kelly | 400/708 |
| 4,265,556 | 5/1981 | Krieg et al. | 400/708 X |
| 4,266,880 | 5/1981 | Buchanan | 400/639.1 X |
| 4,270,868 | 6/1981 | Morgan et al. | 400/320 |
| 4,272,204 | 6/1981 | Quinn, Jr. et al. | 400/708 X |
| 4,273,456 | 6/1981 | Bisczat et al. | 400/568 X |
| 4,279,523 | 7/1981 | Ringle | 400/279 X |

FOREIGN PATENT DOCUMENTS

| | | | |
|---|---|---|---|
| 1088297 | 9/1954 | France | 400/708 |
| 1090636 | 10/1954 | France | 400/708 |

OTHER PUBLICATIONS

IBM Technical Disclosure Bulletin, "Right Hand Margin Set and Print Inhibit", Wipke, vol. 20, No. 10, Mar. 1978, pp. 3996–3997.

IBM Technical Disclosure Bulletin, "Power-Operated Paper Insert Automatically Utilizing Triple Pitch for Typewriter", Lennon, vol. 22, No. 2, Jul. 1979, pp. 661–663.

"Solid State Devices Manual", RCA, Solid State Division, Somerville, N.J., (1975), p. 239.

Primary Examiner—Ernest T. Wright, Jr.
Attorney, Agent, or Firm—Fitzpatrick, Cella, Harper & Scinto

[57] ABSTRACT

A printer includes a carriage supporting a printing mechanism, a platen for carrying printing paper, a detector for detecting presence of the printing paper on the platen, a device for determining margin and/or tabulator positions in relation to an end of the platen, a central processing unit for determining the distance between the end of the platen and the printing paper in response to the detector to convert the margin and/or tabulator positions into positions determined from the edge of the paper and to control the printing mechanism in response to thus converted positions, and a memory for storing signals representing the margin and/or tabulator positions.

7 Claims, 15 Drawing Figures

MARGIN AND TAB STOP DETERMINING APPARATUS RESPONSIVE TO PAGE EDGE SENSOR

This application is a continuation of application Ser. No. 447,519 filed Dec. 7, 1982, now abandoned, which was a continuation of application Ser. No. 173,887, filed July 31, 1980, now abandoned.

BACKGROUND OF THE INVENTION

1. Field of the Invention

The present invention relates to printing apparatus for use for example in a typewriter, and more particularly to printing apparatus in which signals indicative of margin and tabulator positions are stored for example in a memory.

2. Description of the Prior Art

In the conventional printing apparatus, for example in a typewriter, the margin and/or tabulator positions are generally determined mechanically, in which case the positions are determined in relation to the number of characters from the left-hand end of the platen. Also in the recent electronically controlled typewriters the tabulator and/or margin positions are determined by storing signals representative of such positions, determined in relation to the left-hand end of the platen, in electronic memories. In either method, therefore, a certain positional relationship has to be maintained between the printing paper and the platen at the inserting of the paper, thus requiring time and care at the paper insertion.

SUMMARY OF THE INVENTION

An object of the present invention is to provide printing apparatus not characterized by the foregoing drawbacks and allowing the tabulator and/or margin positions to be determined in relation to a lateral edge of the printing paper.

Another object of the present invention is to provide printing apparatus capable of detecting the lateral edge position of the printing paper in advance and correcting the margin and/or tabulator positions in response to the output of the detection.

Still another object of the present invention is to provide printing apparatus capable of functioning according to thus corrected margin and/or tabulator positions.

Still other objects of the present invention will be made apparent from the following description.

DESCRIPTION OF THE PREFERRED EMBODIMENTS

Now the present invention will be clarified more in detail by the following description taken in conjunction with the attached drawing.

Figure 1:
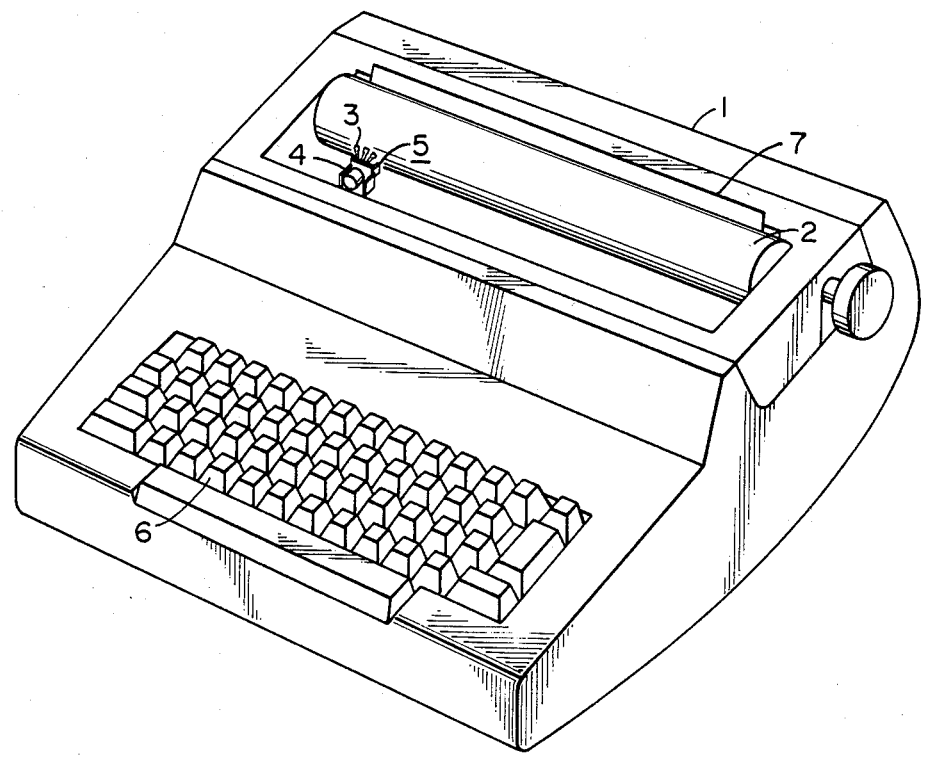
FIG. 1 is a perspective view of a typewriter being an application of the printing apparatus in accordance with the present invention.

FIG. 1 is a view of a typewriter embodying the printing apparatus in accordance with the present invention in which there are shown a main body 1, a platen 2 for supporting and advancing printing paper 7, printing means 3, a carriage 4 for supporting printing means 3, a paper detector 5, and a group of keys 6 for printing characters and figures.

Figure 2:
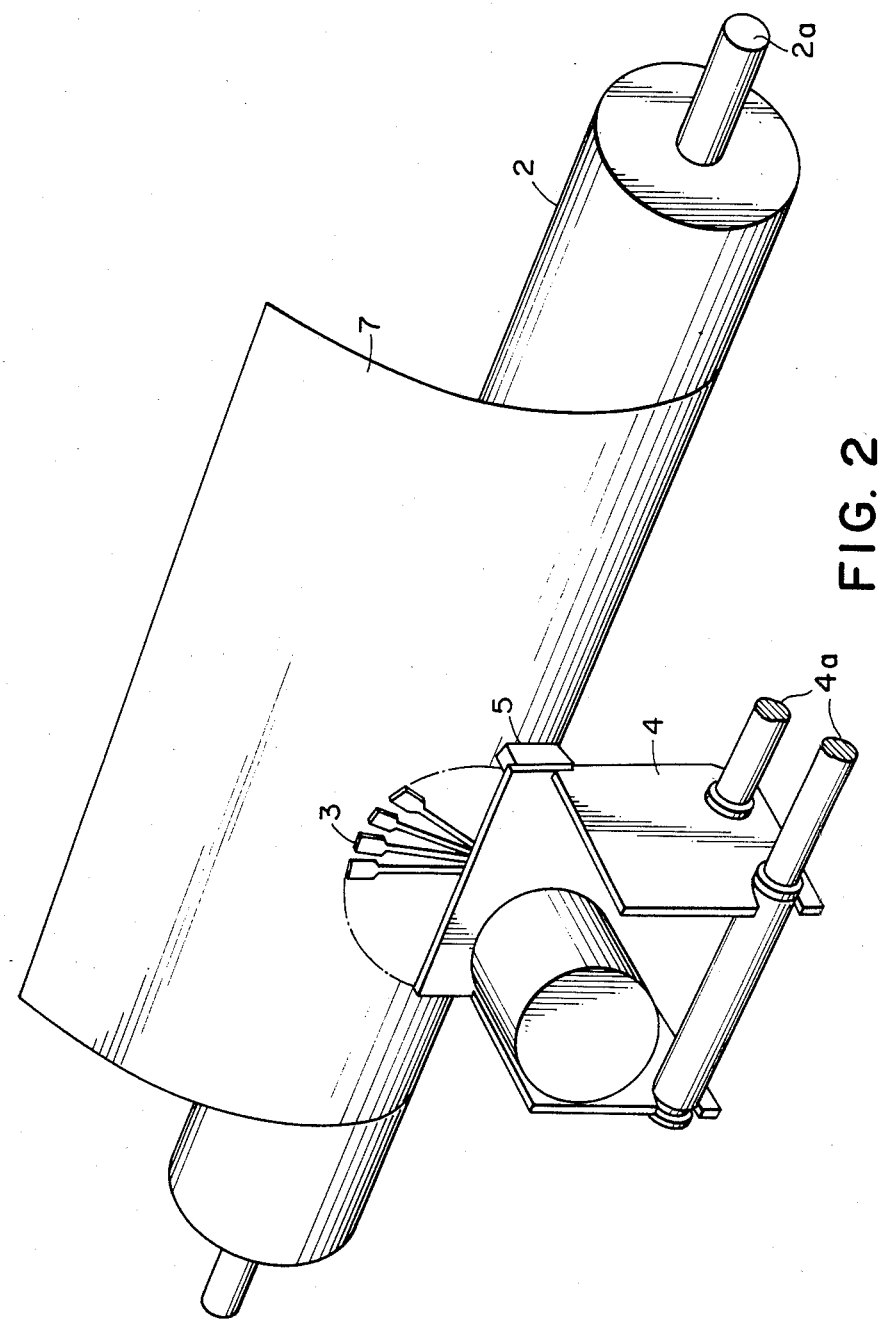
FIG. 2 is a partial magnified view of the apparatus shown in FIG. 1.

FIG. 2 also shows the platen 2 mounted on a shaft 2a, printing means 3, carriage 4 carried on shafts 4a and paper detector 5 in a magnified view for clarifying the relative relationship, wherein paper detector 5 is positioned for example at the right upper corner of carriage 4. Numeral 7 indicates the printing paper supported on platen 2. Paper detector 5 can comprise, as shown in FIG. 3, a light-emitting diode 8 and a phototransistor 9 which are positioned in such a manner that the light-emitting diode 8 emits the light toward the printing paper 7 and the reflected light therefrom is received by the phototransistor 9.

Figures 3, 4:
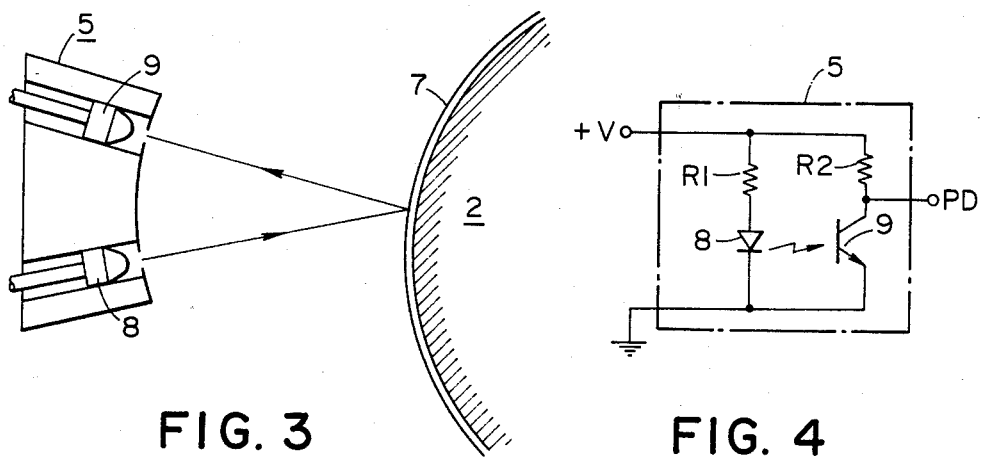
FIG. 3 is a schematic view showing an example of the paper detector employed in the printing apparatus in accordance with the present invention.
FIG. 4 is a circuit diagram of the paper detector shown in FIG. 3.

FIG. 4 shows an example of the circuit of the paper detector 5 comprising the light-emitting diode 8 and the phototransistor 9, wherein light-emitting diode 8 and phototransistor 9 are supplied with power from a power source +V respectively through resistors R1 and R2, and the paper detection output signal is obtained from the collector of phototransistor 9 through an output terminal PD. In more detail, the light-emitting diode 8 emits the light to illuminate the paper 7 under the power supply from the power source +V, and the reflected light from paper 7 is received by the base electrode of the phototransistor 9 to change the collector output signal state thereof.

Figure 5:
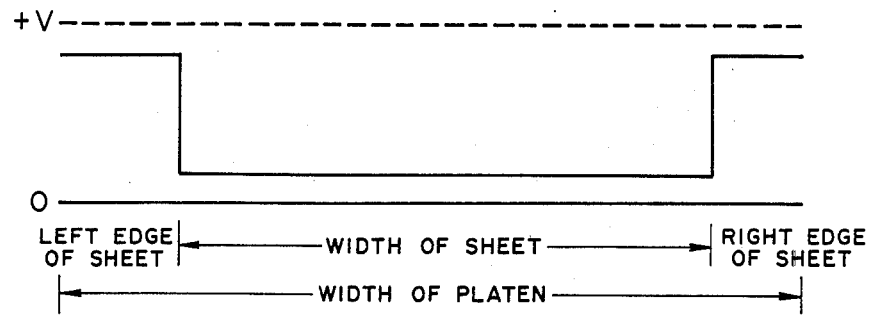
FIG. 5 shows a waveform of an example of the paper detection output signal from the paper detector shown in FIG. 3.

FIG. 5 shows the collector output signal from phototransistor 9 when the aforementioned carriage 4 equipped with the paper detector 5 is displaced from the left-hand end to the right-hand end of the platen 2 while the printing paper 7 is positioned thereon. Upon entry of the reflected light from the paper 7 into the base electrode, phototransistor 9 is rendered conductive whereby the collector voltage thereof is shifted to its lower level. Thus, during the displacement of the carriage 4 from the left-hand edge to the right-hand edge of the printing paper 7 the collector voltage remains at the low level since the base electrode of the phototransistor 9 receives the light reflected by the printing paper 7. Upon passing the right-hand edge of the paper 7, the collector voltage returns to the high level since the base electrode no longer receives the reflected light. In this manner it is possible to detect the relative position of the printing paper 7 with respect to the platen 2, the edge positions and width of the paper 7 etc., from the voltage level change at the terminal PD.

Figure 6:
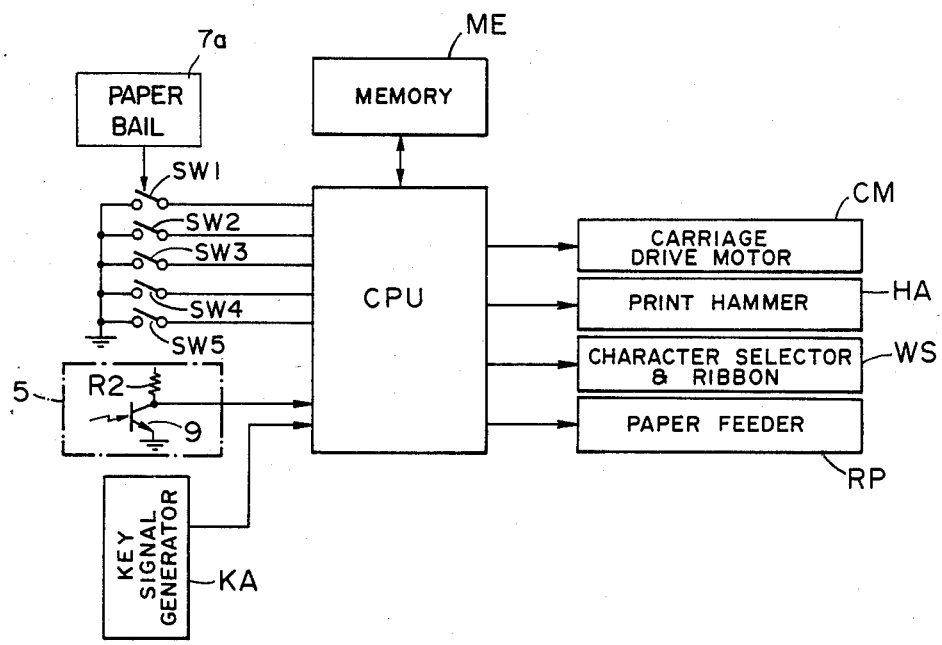
FIG. 6 is a schematic block diagram showing an embodiment of the structure of the printing apparatus in accordance with the present invention.

The paper detection output signal developed from the above-explained paper detector 5 is supplied to a central processing unit CPU shown in FIG. 6. In FIG. 6 a memory ME stores signals representing the desired tabulator and/or margin positions in the form of data of an absolute position measured from the left-hand end of the platen 2. A key signal generating circuit KA generates signals in response to the actuation of print keys 6 for characters and numerals. A carriage drive motor CM, a print hammer HA, a character selector and a printing ribbon control system WS and a paper feeder RP are provided in the printer 10 and are controlled in response to the control signals from central processing unit CPU. Also there are shown a switch SW1 to be actuated in connection with the paper pressing action of a paper bail 7a, switches SW2 and SW3 respectively for setting and clearing the paper margin, and switches SW4 and SW5 respectively for setting and clearing the tabulator position, switches SW2-SW5 being adapted, by actuation, to write and erase, in memory ME, the data of the tabulator and/or margin positions represented by the absolute position from the left-hand end of the platen 2 as explained in the foregoing. Switches SW2-SW5 may also be so structured that they are actuated in response to the key actuations of the keyboard KB as shown in FIG. 7.

Figure 7:
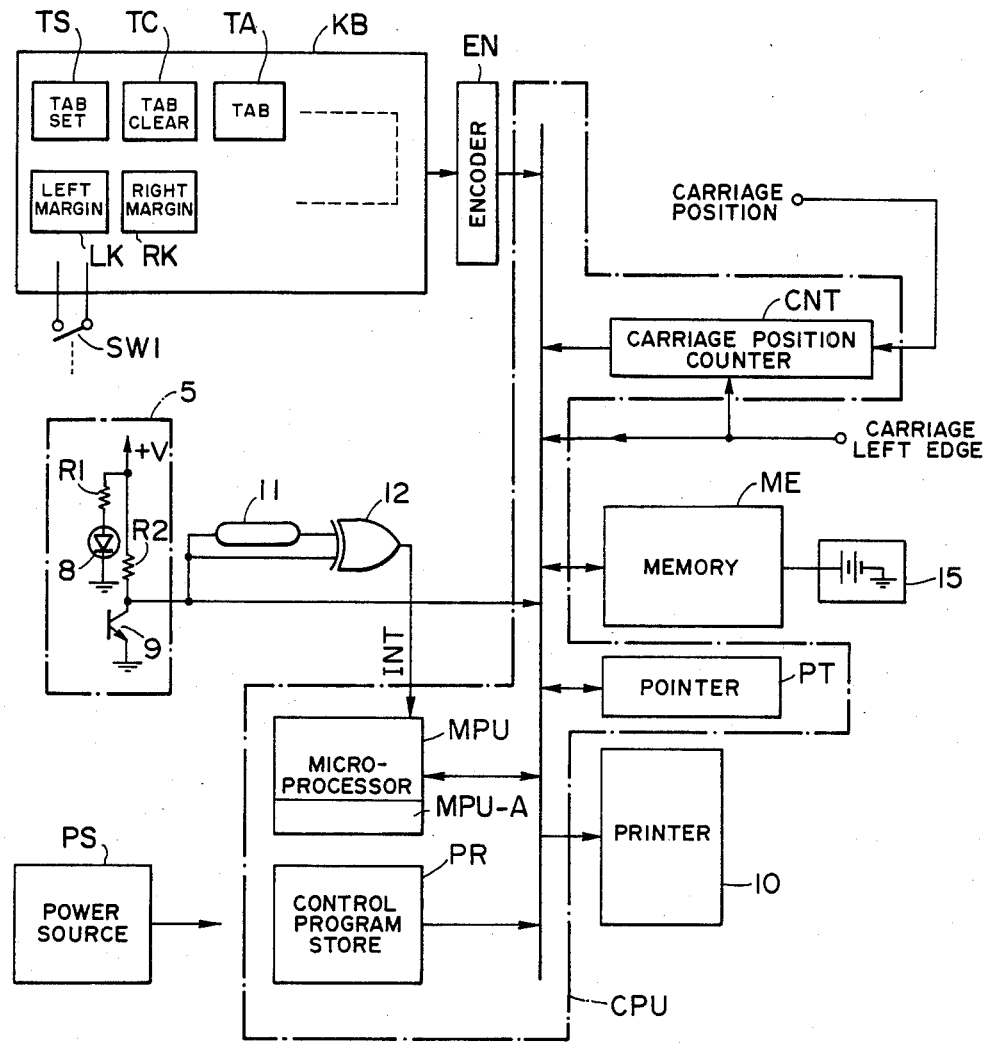
FIG. 7 is a schematic diagram showing more in detail the circuitry of FIG. 6.

FIG. 7 is a further detailed diagram showing the arrangement of FIG. 6 in which the central processing unit CPU is provided with a carriage position counter CNT for counting the distance of displacement of the carriage 4, a pointer PT for indicating the address of the memory ME, a memory PR for storing the control sequences as shown in the flow charts of FIGS. 10 through 12C, and a microprocessor unit MPU for controlling the operations of various units according to the control sequences.

As further shown in FIG. 7, power source PS supplies electric power to the central processing unit CPU. The keyboard KB is provided with a tabulator set key TS for setting the tabulator, a tabulator clear key TC for clearing the set tabulator, a tabulator key TA for retrieving the tabulator position, a left margin key LK for setting the left margin, and a right margin key RK for setting the right margin. An encoder EN converts a keyed input from the keyboard KB into a binary signal.

As noted above, the paper detector 5 is composed of a photodiode 8 and a photo transistor 9. The output of the paper detector 5 is applied to the input of delay circuit 11 and one input of exclusive-OR circuit 12. The output of the delay circuit 11 is applied to another input of the exclusive OR circuit 12 and the output of the exclusive OR circuit 12 is applied to the microprocessor MPU in the central processing unit CPU. The output of the central processing unit CPU is provided to the printer 10. The memory ME also has an auxiliary power source 15.

Figure 8:
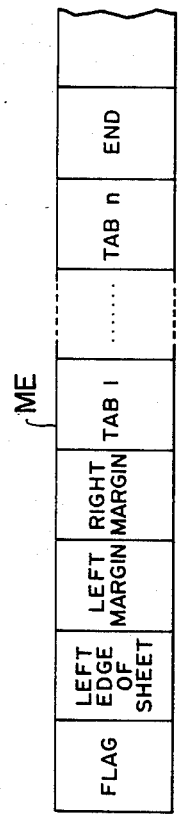
FIG. 8 is a diagram showing the contents of the memory.

FIG. 8 shows the contents of the memory ME (FIG. 7), which as noted is provided with an auxiliary power source 15 for retaining the stored contents even when the power supply is cut off.

Figure 9:
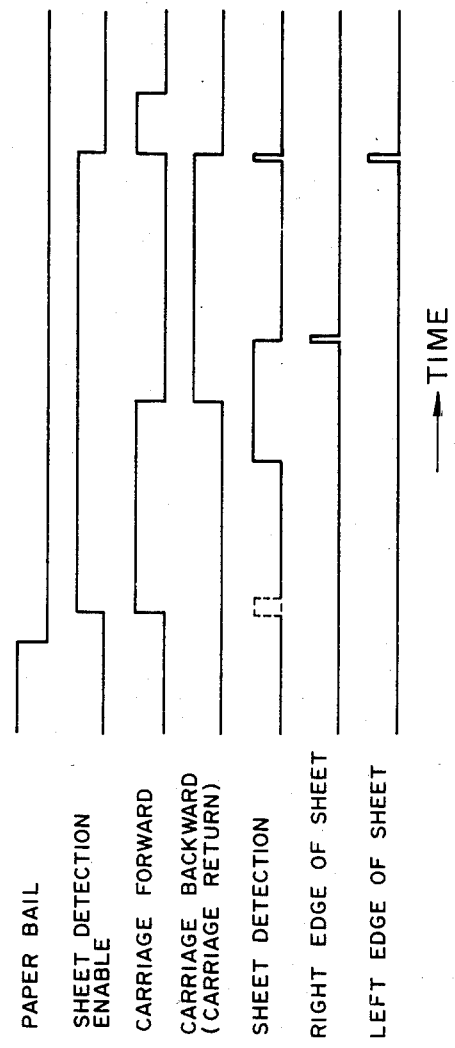
FIg. 9 is a timing chart showing various signals in the printing apparatus shown in FIGS. 6 and 7.
Figure 10:
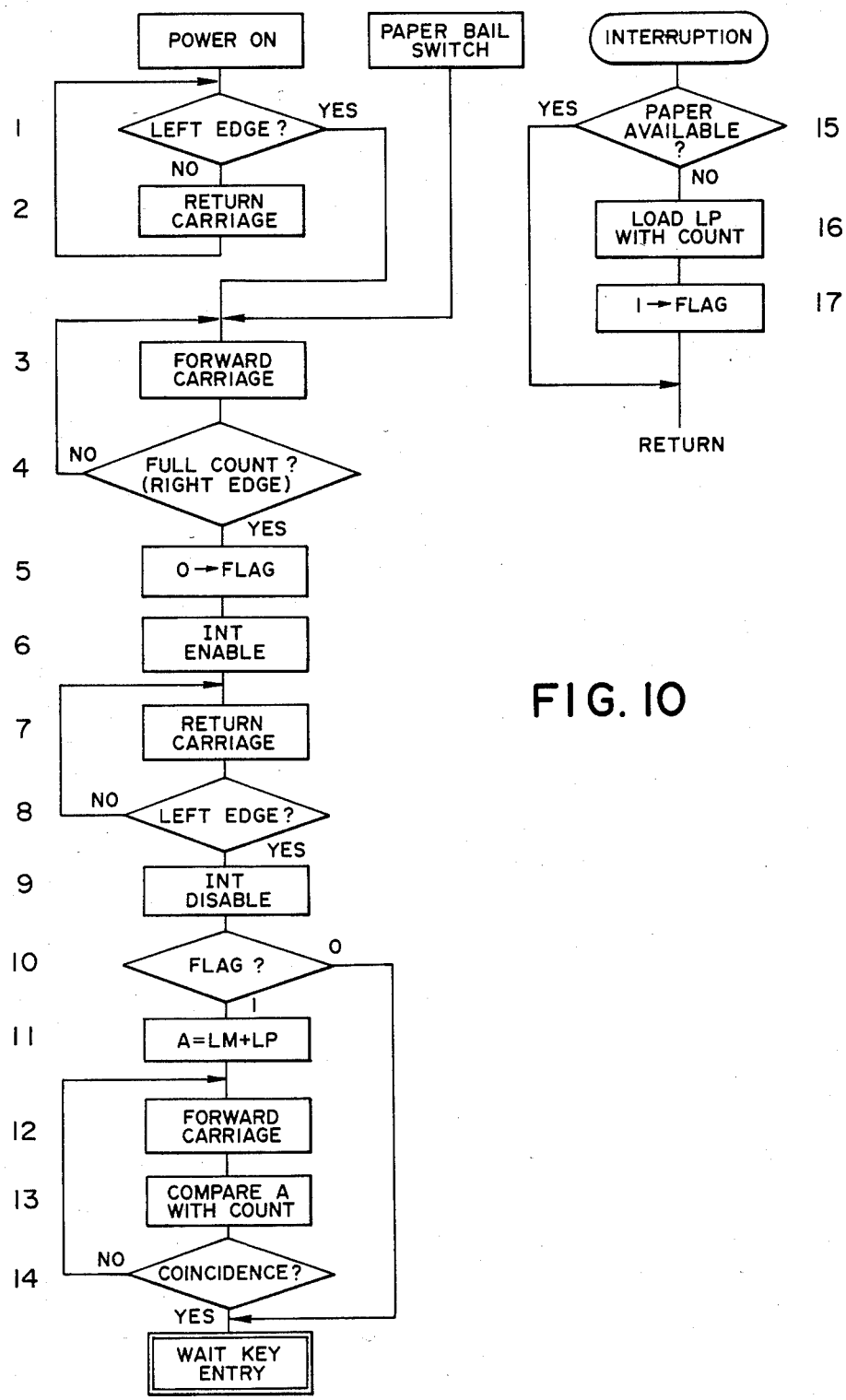
FIG. 10 is a control flow chart illustrating the sequences determining the distance from the left-hand end of the platen to the left-hand edge of the printing paper.

Now there will be given an explanation on the procedure of determining the tabulator and/or margin positions and the operation of detecting the paper position in the printing apparatus in accordance with the present invention, while making reference to the timing chart shown in FIG. 9 and the flow charts shown in FIGS. 10 through 12C.

Upon turning on of the power source PS, the microprocessor (hereinafter referred to as MPU) in the central processor unit CPU identifies whether the carriage 4 is at the left-hand end position. In case the carriage 4 is not located at the left-hand end position, the carriage drive motor CM is driven to cause the leftward displacement of the carriage 4. Upon arrival of the carriage 4 at the left-hand end position, the carriage position counter CNT in the central processor unit CPU is cleared (steps 1, 2). When the printing paper 7 is set around the platen 2 and the paper bail 7a is manipulated, the switch SW1 is closed in response. Then, in order to detect the paper position, the carriage 4 is displaced to the right-hand end position of the platen 2, or the maximum value of the carriage position counter CNT (steps 3, 4). The rightward displacement of the carriage 4 is identified by the central processor unit CPU as shown in FIG. 9. Although the paper detector 5 generates the paper detection output signals, the central processor unit CPU inhibits the identification of the right-hand and left-hand edges of the paper 7 so that the right- or left-edge detection pulses are not generated as shown in FIG. 9.

Upon arrival of the carriage 4 at the right-hand end position, the flag of the flip-flop for indicating the presence of paper 7 in the memory ME as shown in FIG. 8 is cleared (step 5), and the interruption line INT is enabled (step 6). Successively the carriage 4 performs the returning or leftward displacement, which is identified by the central processor unit CPU. Upon detection of the paper edge by the paper detector 5 during the displacement, the collector output signal from the phototransistor 9 is supplied to an input terminal of an exclusive-OR gate 12 and is also supplied to another input terminal thereof through a delay circuit 11 whereby the exclusive-OR gate 12 generates a paper edge detection pulse which is supplied as an interruption demand signal to the microprocessor MPU for conducting the interruption of the program sequence. As the carriage 4 is displacing to the left, the paper edge is identified as the right-hand edge or left-hand edge respectively by whether or not the presence of paper 7 is detected at the time of the interruption demand. In case the paper edge is identified as the right-hand edge at the step 15, the central processor unit CPU returns to the original routine to control the leftward displacement of the carriage 4. Also when the left-hand edge is detected, the central processor unit CPU stores, during the interruption routine, the content of the carriage position counter CNT indicating the distance from the left-hand end of the platen 2 to the left-hand edge of the printing paper 7 at a location in the memory ME for storing the left end position of the paper 7 (step 16), then sets the aforementioned flag (step 17) and returns to the original routing for controlling the leftward displacement of the carriage 4. Upon arrival of the carriage at the left-hand end position of the platen 2, the left end signal is entered to the central processor unit CPU, whereby the interruption line INT is disabled (step 9). Then the content of the aforementioned flag is identified (step 10), and, in case it is "1" indicating the presence of paper 7, the content LM of the left margin memory address in the memory ME and the content LP of the aforementioned paper left end position memory address are added and stored in an accumulator MPU-A in the microprocessor unit MPU (step 11). Then the carriage 4 is displaced to the right until the content of the carriage position counter CNT becomes equal to the content of the accumulator MPU-A and thus is stopped at the left margin position (steps 12-14).

Figure 11A:
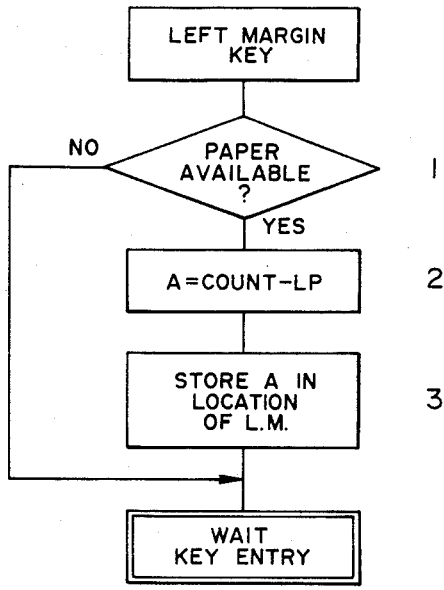
FIG. 11A is a control flow chart illustrating the sequences setting the left margin.
Figure 11B:
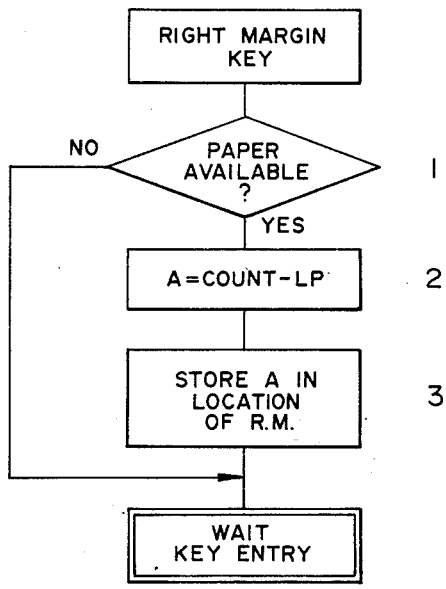
FIG. 11B is a control flow chart illustrating the sequences setting the right margin.

In the case of changing the left margin position, the carriage 4 is displaced to a desired position and a left margin key LK in the keyboard KB is actuated as shown in FIG. 11A, whereby the microprocessor MPU identifies the presence or absence of paper 7 (step 1), and, in the case of the presence of paper 7, the microprocessor MPU calculates the distance from the left-hand edge of the paper 7 to the carriage position by subtracting the paper left edge position LP from the count of the carriage position counter CNT, stores the obtained result in the accumulator MPU-A (step 2) and further stores the content of the accumulator MPU-A in the left margin position memory location LM of the memory ME. The change of the right margin position can also be made in a similar manner as shown in FIG. 11B.

Figure 12A:
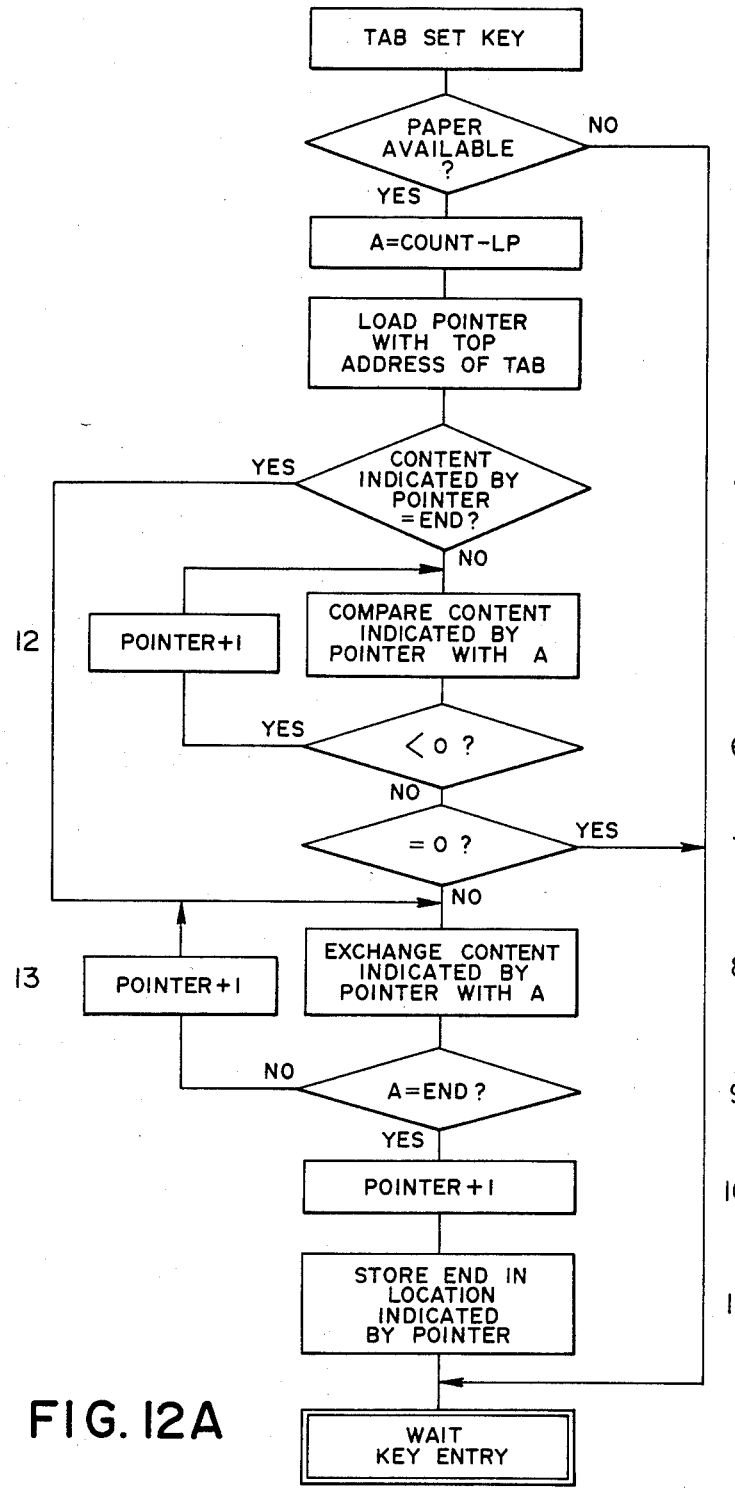
FIG. 12A is a control flow chart showing the sequences of tabulator setting.

FIG. 12A shows the procedure for tabulator setting. Upon actuation of the tabulator set key TS, the microprocessor MPU identifies the presence or absence of paper 7 (step 1). In the case of the presence of the paper 7, the microprocessor MPU subtracts the paper left edge position LP from the count of the carriage position counter CNT indicating the current carriage position, and stores the obtained result in the accumulator MPU-A (step 2). Subsequently the first address of the tabulator position memory area in the memory ME is set in the pointer PT (step 3). Then the microprocessor MPU identifies if the content of the address indicated by pointer PT is equal to the end code END of the tabulator memory area (step 4), and, if equal, proceeds to the step 8. If not equal, the content of the location indicated by pointer PT is compared with the content of the accumulator MPU-A in the steps 5 and 6, and if the former is smaller than the latter, the steps 5 and 6 are repeated after the address indicated by the pointer PT is incremented in the step 12. Also if the former is not smaller, it is identified whether the content of the address indicated by the pointer PT is equal to the content of the accumulator MPU-A (step 7), and, no function is executed if the contents mutually coincide. Also if they are not equal, the content of the accumulator MPU-A is stored in the location indicated by the pointer PT and the content of that location is stored in the accumulator MPU-A (step 8). Then it is identified whether the content of the accumulator MPU-A is equal to the end code END of the tabulator memory area (step 9), and, if not equal, the aforementioned steps 8 and 9 are repeated after the address indicated by the pointer PT is incremented in the step 13. On the other hand if they are mutually equal, the address indicated by the pointer PT is incremented (step 10), and the end code END of the tabulator memory area is stored in that location. As explained in the foregoing, the presence or absence of paper 7 is detected. Only in the case of the presence of paper 7, the distance from the left-hand edge of the paper 7 to the carriage position is determined and the data for the tabulator positions are rearranged in the increasing order by examining the tabulator position memory area.

Figure 12B:
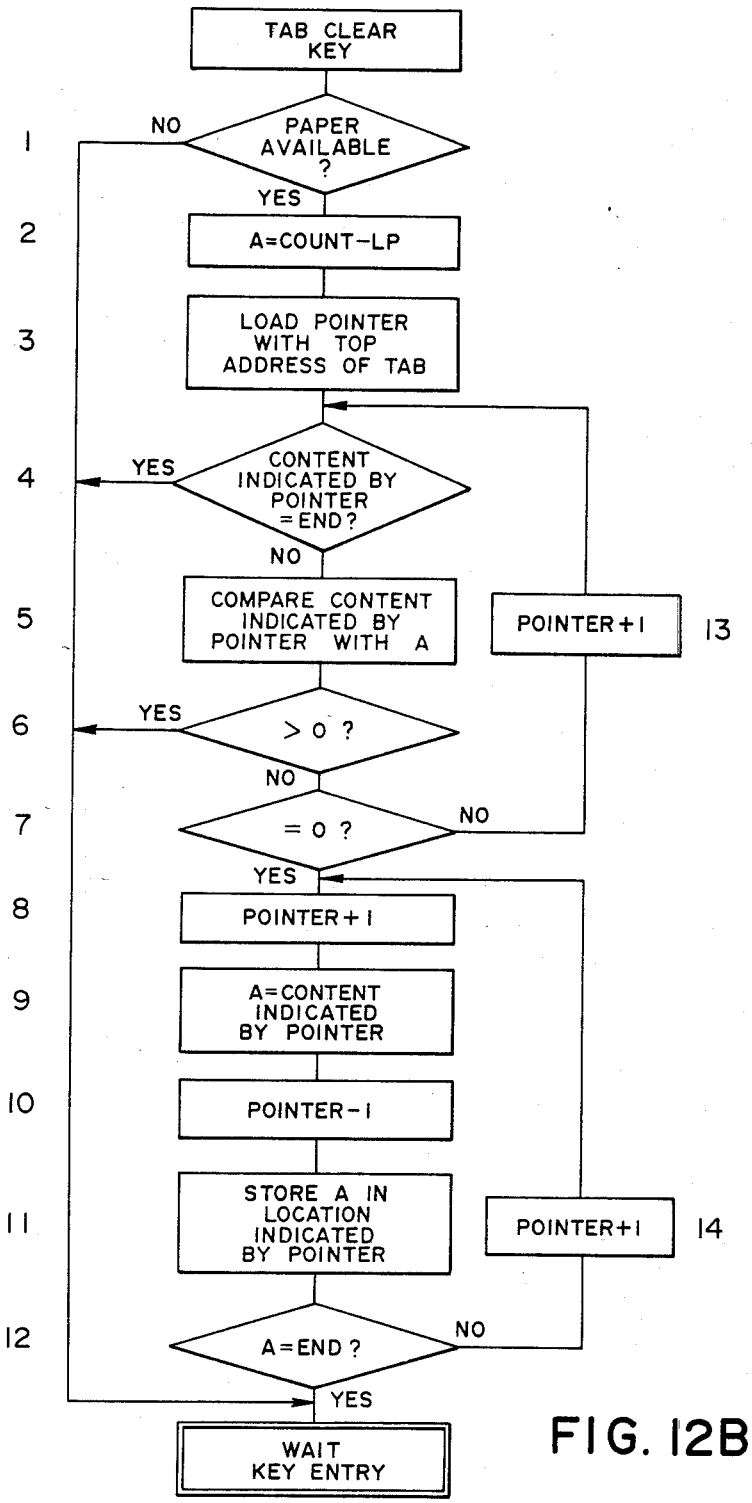
FIG. 12B is a control flow chart showing the sequences of tabulator clearing.

Now there will be explained the procedure for tabulator clearing shown in FIG. 12B. Upon actuation of the tabulator clear key TC, the microprocessor MPU identifies the presence or absence of paper 7 (step 1). In case the paper 7 is present, the microprocessor MPU subtracts a signal representative of the left-hand edge position LP of the paper 7 from the count of the carriage position counter CNT indicating the current carriage position and stores the obtained result in the accumulator MPU-A (step 2). Subsequently the first address of the tabulator position memory area in the memory ME is set in the pointer PT (step 3). It is then identified whether the content of the address indicated by pointer PT is equal to the end code END of the tabulator position memory area (step 4), and no operation is executed if they are mutually equal. If they are not equal, the content of the address indicated by the pointer PT is compared with the content of the accumulator MPU-A in the steps 5 and 6, and no function is executed if the former is larger than the latter. If the former is not larger, it is identified whether the content of the address location indicated by the pointer PT is equal to the content of the accumulator MPU-A (step 7), and, if not equal, the foregoing steps 4 to 7 are repeated after the address indicated by the pointer PT is incremented in the step 13. If they are mutually equal, the address indicated by the pointer PT is incremented (step 8), and the content of the address indicated by the pointer PT is transferred to the accumulator MPU-A (step 9). Subsequently the address indicated by the pointer PT is decremented (step 10), and the content of the accumulator MPU-A is transferred to the thus decremented address location (step 11). Then it is identified whether the content of the accumulator MPU-A is the end code END of the tabulator position memory area (step 12), and, if not, the aforementioned steps 8 and 12 are repeated after the address indicated by the pointer PT is incremented in the step 14. As discussed in the foregoing and in manner similar to the tabulator setting, the distance from the left edge of the paper 7 to the carriage position is determined only when the paper 7 is present, and the tabulator position memory area in the memory ME is surveyed and the corresponding tabulator position information, if present, is erased. Thereafter the succeeding data to the end code are in succession shifted to the respectively neighboring addresses. Naturally no operation is executed in case there is no such corresponding tabulator position information.

Figure 12C:
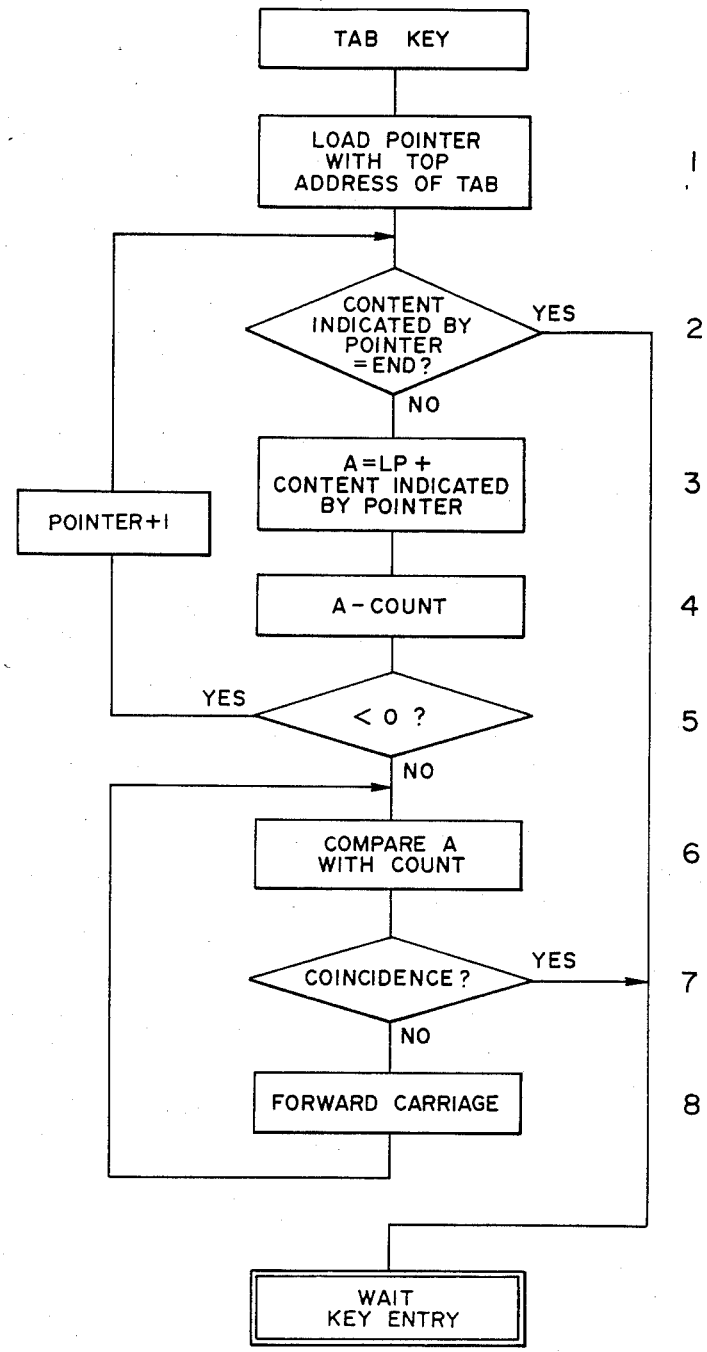
FIG. 12C is a control flow chart showing the sequences in which the tabulator key is actuated.

Now reference is made to FIG. 12C showing the procedure when the tabulator key TA is actuated. Upon actuation of the tabulator key TA, the tabulator information stored in the tabulator position memory area in the memory Me is surveyed from the first address. This is done by setting the first address in the pointer PT (step 1). Then it is identified whether the content of the address location is the end code END of the tabulator position memory area (step 2), and if not, the information of the distance LP to the left-hand edge of the paper 7 is added to the tabulator position information read from that address and stored in the accumulator MPU-A (step 3). Then the count of the carriage position counter CNT indicating the current carriage position is subtracted from the content of the acumulator MPU-A (step 4), and it is identified whether the result of the subtraction is negative (step 5). If the result is negative, the aforementioned steps 2 to 5 are repeated after the address of the pointer PT is incremented. In case it is not negative, it is identified whether the content of the accumulator MPU-A coincides with the count (steps 6 and 7), and, in the case of no coincidence, the carriage 4 is displaced to the right (step 8) to a position corresponding to a minimum tabulator position larger than the count of the carriage position counter CNT.

In this state desired characters or numerals will be printed on the paper 7 by actuating the printing keys 6.

In this manner, in response to each actuation of the tabulator key TA the carriage 4 is displaced without printing operation to the succeeding tabulator position stored in the tabulator position memory area in the memory ME.

The printing apparatus may also be structured as to inhibit the printing operation beyond the right margin position.

No explanation will be given to other keys such as a carriage return key and a back space key, but all these keys function in relation to the aforementioned corrected left margin position (not determined as a position on the platen 2 but as a position from the left-hand edge of the printing paper 7).

At the replacement of the printing paper 7 the paper bail 7a provided above the platen 2 is at first lifted and again replaced after the paper 7 is set, whereby the switch SW1 linked with the paper bail 7a is actuated to enable data read-in from the keyboard KB. In this state the carriage position counter CNT is already initialized, so that the procedure can be started in the same manner when the power supply PS is turned on, after the carriage 4 is displaced to the right-hand end position.

As explained in the foregoing, the determination of the tabulator and/or margin positions with respect to an edge of the printing paper 7 allows to eliminate the cumbersome care for the positional relationship between the platen 2 and the printing paper 7 at the insertion thereof.

What is claimed is:

1. A printer, in which a mounting position of a recording member can be freely selected, comprising:
   printing means for printing on the recording member;
   detecting means for detecting a predetermined position of said recording member relative to a reference position;
   a bail having a holding position for holding said recording member in operative relation to said printing means;
   switch means for detecting the position of said bail;
   a carriage on which said printing means and said detecting means are mounted, said carriage being mounted for movement in one direction relative to the recording member in response to detection by said switch means that said bail is in the holding position thereof and from a turning position in a different direction relative to the recording member after said movement in said one direction; and
   control means for controlling said movement of said carriage, said control means inhibiting detection by said detecting means during said movement in said one direction, enabling detection by said detecting means during movement of said carriage in said different direction and stopping said carriage at a desired stop position relative to said predetermined position.

2. A printer according to claim 1, wherein said predetermined position is a left edge of said recording member.

3. A printer according to claim 1, wherein said control means causes said carriage to stop at said stop position which is the same as said predetermined position.

4. A printer according to claim 3, wherein said predetermined position is a left edge of said recording member.

5. A printer according to claim 1, wherein said one direction is a direction of printing.

6. A printer according to claim 1, wherein said predetermined position is one of the left edge and the right edge of said recording member.

7. A printer according to claim 1, wherein the movement of said detecting means in said one direction and said different direction is carried out prior to an initial printing operation by said printing means.

* * * * *